April 18, 1933.  M. A. KENT  1,904,472
ELECTRICAL CABLE
Filed Sept. 29, 1928
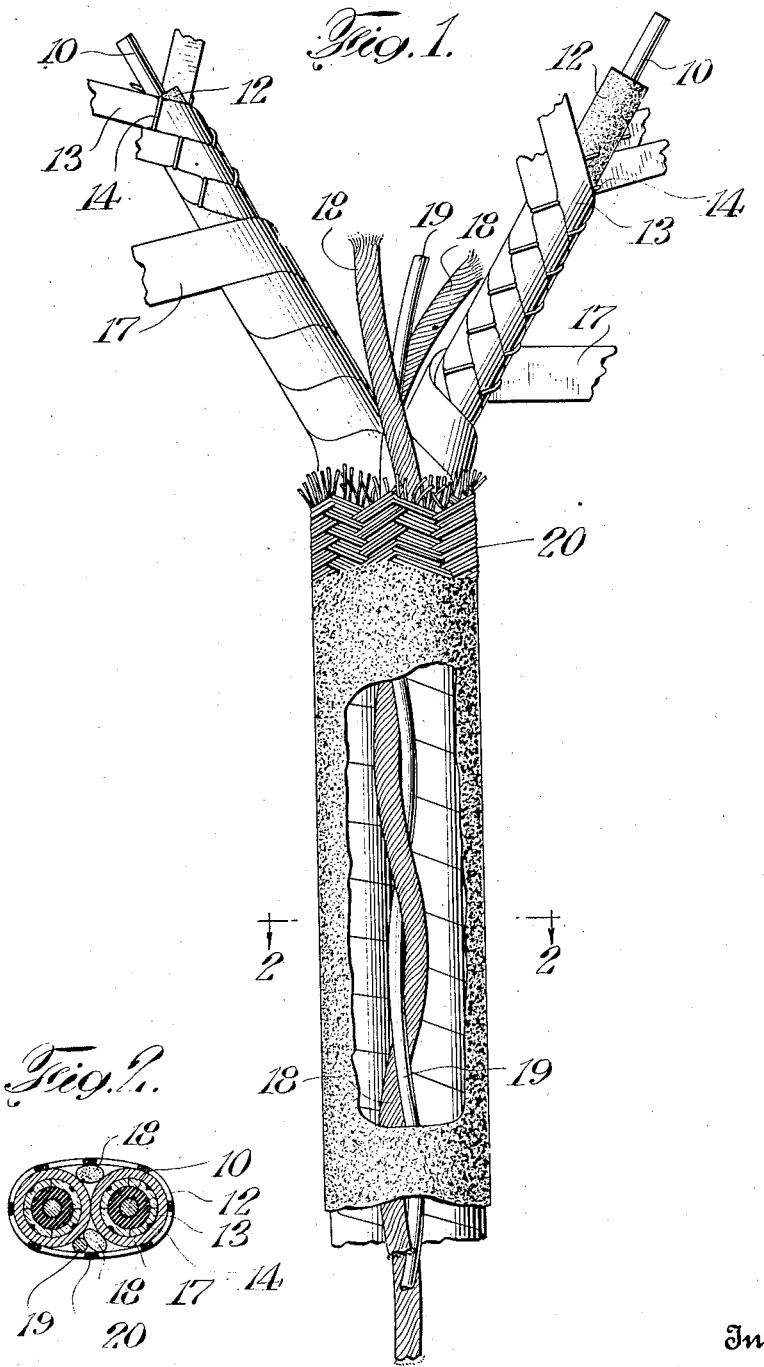
Inventor
M. A. Kent
By Attorney
Emery, Booth, Janney & Varney.

Patented Apr. 18, 1933

1,904,472

UNITED STATES PATENT OFFICE

MOSS A. KENT, OF ROME, NEW YORK, ASSIGNOR TO GENERAL CABLE CORPORATION, OF NEW YORK, N. Y., A CORPORATION OF NEW JERSEY

ELECTRICAL CABLE

Application filed September 29, 1928. Serial No. 309,145.

This invention relates to electrical cables, particularly to electrical cables which carry a ground wire for bonding metallic fixtures and for grounding a plurality of such bonded fixtures in any suitable or customary manner. Among the objects of the invention is the provision of a multiple conductor cable of the type specified which will have the required flexibility for bending even at sharp angles; which will have sufficient strength to meet the required tensile tests; which will avoid undue stretching or kinking of the ground wire when the cable is stretched or bent; which will have the valleys properly filled to form a smooth surfaced cable when the cover or sheath is applied, preferably with the ground wire in whole or in part providing the filling for one of the valleys between the other conductors of the cable; which when the ground wire is placed in one of the valleys will not be subject to the wire slipping through between the conductors to the opposite valley when the cable is bent; and the provision of a cable which is a general improvement in the art. Other objects and various novel features will be made apparent from the following description of one illustrative embodiment of the invention.

An understanding of the invention will be assisted by reference to the accompanying drawing forming part of this specification, and wherein:

Fig. 1 is a view in elevation partly in section, of one form of cable according to this invention; and Fig. 2 is a cross section of the cable on the line 2—2 of Fig. 1.

In the wiring of buildings according to recent practices, more particularly in wiring with non-metallic sheathed cable, there has arisen a demand for a cable having a ground wire in addition to the wires ordinarily employed for forming the circuit for the electrical appliances. Preferably, the cable will carry two fully insulated conductors and a third conductor for bonding and grounding the fittings and fixtures. Generally the sheath of metal armored cable has been employed for bonding and grounding. This type of cable has its own advantages and disadvantages as compared to other types of cables. It has been found that for many uses a non-metallic sheathed cable is fully as good and often better than a metallic sheathed cable and moreover the non-metallic cable can be more economically manufactured, more easily installed and is not subject to corrosion if properly treated to the same extent as metallic sheathed cable.

The present invention, therefore, takes up for consideration the subject of placing a bonding or grounding wire in a cable having two or more fully insulated conductors, and inasmuch as the invention may be more widely used with non-metallic sheathed cable as distinguished from metallic sheathed cable, further description will be confined to non-metallic sheathed cable. Again, since a two-conductor cable is the type used almost to the exclusion of all others, the following description will be particularly directed to this type.

In order to give a non-metallic sheathed cable of this type sufficient tensile strength, it has been common to place strengthening strands in the valleys of the cable beneath the outer sheath. Such a cable is disclosed in the patent to Abbott, No. 1,520,680 and shown in the drawing as comprising two metallic conductors 10 which are covered with an insulating compound 12 such, for example, as rubber. Upon this insulation is wound a protective material 13 such as tough folded and treated paper tape, held in place if desired by light braided threads 14 woven with the paper. Conveniently the coverings 13 for the two conductors are of different color for distinction. Over this covering a second protective covering 17, which may be of similar material, is wound. The valleys between the insulated conductors are filled by strands 18 of suitable material to give the required tensile strength and provide a smooth overall assembly when a braided fibrous wrapper 20 is put on.

According to the present invention a ground wire 19 is laid in one of the valleys and the other valley or valleys may be filled by fibrous strands in the usual way. Due to the kind of service required of the ground wire and the fact that the other conductors 10 are fully insulated the ground wire may be left bare. The ground wire will provide a considerable portion of the required tensile strength and such other strands as are still required when the ground wire is used may be of less expensive material than is required when no ground wire is employed. For example, where a special expensive jute cord was previously used it will now be possible to substitute a moderately good grade of twisted paper.

The diameter of the ground wire is relatively small compared to the overall diameter of the insulated wires, consequently if a straight ground wire is laid in one of the valleys and the cable is bent with the ground wire on the outer circumference of the bend, the wire tends to pull through the space between the insulated wires to the valley on the other side, which is objectionable. Further, when a straight ground wire is laid in the valley between the larger conductors and the cable bent as above with the ground wire on the outside diameter of the bend, if the wire does not pull through the space between the other conductors, it will naturally be stretched, and being of soft material will permanently elongate. Then, when the cable is straightened the ground wire thus elongated must buckle, which also is objectionable. Likewise, when the cable is bent with the ground wire on the inner circumference of the bend, it is likely to buckle in the first instance after the manner mentioned above where the wire is first stretched by bending and then straightened, and the same objections apply. In its manufacture the cable must be frequently wound on drums or carried over pulleys where such bending occurs. Also in installing the cable, it is frequently bent.

According to this invention, as shown in Fig. 1, the ground wire is given a curl, crimp or other deformation throughout its length so that it will project laterally so as to rest upon the sides of the insulated conductors in the valley between them. Consequently, the wire will not be pulled through when the cable is bent. Further, since the wire has crimps or bends in it, it will elongate without producing permanent deformation. When the cable is bent in such a way that the ground wire must shorten, any buckle, which tends to form in it, will spread over several of the crimps and produce only a slight accentuation of any one of them.

Conveniently the required deformation may be imparted to the ground wire 19 by twisting it with one of the fibrous strands 18, to form convolutions in the wire and the fibrous strand. The fibrous strand 18 may be of any required diameter to furnish, when twisted with the wire, a valley filler of proper size for various sizes of insulated conductors. The flexibility and stretch of the ground wire may be determined by the number of convolutions per unit of length.

Practically the ground wire and fibrous strand may be twisted as fed into the cable by supplying them from a pair of reels mounted to revolve about a shaft between them.

I claim as my invention:

1. An electric cable comprising a plurality of insulated conductors, filling strands in the valleys between said conductors, one of said filling strands including a bare wire twisted with a paper strand to form convolutions in the wire and the paper strand, and a wrapper enclosing the whole.

2. An electric cable comprising a plurality of insulated conductors, filling strands in the valleys between said conductors, one of said filling strands including a bare wire twisted with a fibrous strand, to form convolutions in the wire and the fibrous strand and a wrapper enclosing the whole.

3. An electric cable comprising a plurality of insulated conductors, fillers in the valleys between said conductors, one of said fillers including a conductor twisted with a fibrous strand to form convolutions in said last-mentioned conductor and the fibrous strand, and a non-metallic wrapper enclosing the whole.

In testimony whereof, I have signed my name to this specification this 27 day of September, 1928.

MOSS A. KENT.